United States Patent
Sakamoto et al.

(10) Patent No.: US 10,714,914 B2
(45) Date of Patent: Jul. 14, 2020

(54) STRIPPING APPARATUS AND STRIPPING STATION

(71) Applicant: HONDA MOTOR CO., LTD., Tokyo (JP)

(72) Inventors: Ryuzo Sakamoto, Tochigi (JP);
Kenichi Omagari, Tochigi (JP);
Kenichi Ono, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 227 days.

(21) Appl. No.: 15/706,805

(22) Filed: Sep. 18, 2017

(65) Prior Publication Data

US 2018/0083430 A1 Mar. 22, 2018

(30) Foreign Application Priority Data

Sep. 20, 2016 (JP) ................................ 2016-182861

(51) Int. Cl.
*H02G 1/12* (2006.01)
*H01B 15/00* (2006.01)

(52) U.S. Cl.
CPC ......... *H02G 1/1253* (2013.01); *H02G 1/1248* (2013.01); *H02G 1/1256* (2013.01); *H01B 15/005* (2013.01); *Y02W 30/821* (2015.05)

(58) Field of Classification Search
CPC .. H02G 1/1248; H02G 1/1253; H02G 1/1256; H02G 1/1258; H02G 1/1295; H01B 15/005; Y02W 30/821

(Continued)

(56) References Cited

U.S. PATENT DOCUMENTS 3,591,754 A * 7/1971 Baldwin, Jr. ........ H02G 1/1275
219/50
4,738,027 A * 4/1988 Bermier, Jr. ......... H01B 7/0823
29/825

(Continued)

FOREIGN PATENT DOCUMENTS

CN 103683124 A 3/2014
JP 59-226640 12/1984

(Continued)

OTHER PUBLICATIONS

Japanese Notification of Reasons for Refusal dated Mar. 6, 2018, 2 pages.
Chinese Office Action dated Apr. 4, 2019, 7 pages.

*Primary Examiner* — Monica S Carter
*Assistant Examiner* — Marcel T Dion
(74) *Attorney, Agent, or Firm* — Rankin, Hill & Clark LLP

(57) ABSTRACT

A stripping apparatus and a stripping station capable of reducing cycle time for steps of stripping an insulation coating from a conducting wire material are provided. A stripping apparatus configured to strip an insulation coating WL from a conducting wire material W, including the insulation coating WL and cross-section of which orthogonal to a longitudinal direction has a rectangular shape, the stripping apparatus includes: an upper mold 150 provided with a stripping blade configured to strip the insulation coating WL; a lower mold 110 configured to support the conducting wire material W from a lower side thereof; a pressing member 130 configured to prevent displacement of the conducting wire material W; and a rotation mechanism configured to rotate the conducting wire material W around a rotational axis C1 that is parallel to a axial center of the conducting wire material W.

5 Claims, 17 Drawing Sheets

(58) Field of Classification Search
USPC .......................................................... 81/9.51
See application file for complete search history.

(56) References Cited

U.S. PATENT DOCUMENTS

| | | | | |
|---|---|---|---|---|
| 4,784,024 A | * | 11/1988 | Butler | H02G 1/1258 |
| | | | | 81/9.51 |
| 9,318,235 B2 | | 4/2016 | Sato | |
| 2004/0134965 A1 | * | 7/2004 | Stepan | H02G 1/1248 |
| | | | | 228/1.1 |
| 2005/0211025 A1 | * | 9/2005 | Steuri | H02G 1/1256 |
| | | | | 81/9.51 |
| 2014/0076498 A1 | | 3/2014 | Sato | |
| 2015/0052736 A1 | | 2/2015 | Hayashi et al. | |
| 2016/0268787 A1 | * | 9/2016 | Taucher | H02G 1/1256 |

FOREIGN PATENT DOCUMENTS

| | | |
|---|---|---|
| JP | 2014-60860 | 4/2014 |
| JP | 5681248 | 3/2015 |
| JP | 5781908 | 9/2015 |

\* cited by examiner

STRIPPING APPARATUS AND STRIPPING STATION

This application is based on and claims the benefit of priority from Japanese Patent Application No. 2016-182861, filed on 20 Sep. 2016, the content of which is incorporated herein by reference.

BACKGROUND OF THE INVENTION

Field of the Invention

The present invention relates to a stripping apparatus and a stripping station.

Related Art

An apparatus that strips insulation coating and cuts conducting wire material each time an insulation-coated conducting wire material is fed to manufacture a coil segment has been conventionally known in the art (See Patent Document 1, for example). Such an apparatus repeats a feeding step, a stripping step, a cutting step, and a stripping position changing step.

A film stripping apparatus and a film stripping method for stripping a film formed on the outer surface of a wire material have been known (see Patent Document 2, for example). The film stripping apparatus includes: a rotary member that is configured to receive a wire material in a penetrating manner and is rotatable around the wire material; a pair of cutting tools disposed to hold the wire material therebetween; and cutting-tool rotating means that rotates the rotary member together with the pair of cutting tools having the wire material as a center of rotation.

Patent Document 1: Japanese Patent No. 5681248
Patent Document 2: Japanese Patent No. 5781908

SUMMARY OF THE INVENTION

The apparatus disclosed in Patent Document 1 is placed into a standby state during a step of feeding a conducting wire material, and does not perform processing steps, such as a step of stripping insulation coating, a step of cutting a conducting wire material. Accordingly, it takes time to complete the processing of a conducting wire material. According to the apparatus disclosed in Patent Document 2, a cutting tool is rotated together with a rotary member around the wire material, which causes an enlargement of equipment including the apparatus. Such a configuration in which the cutting tool is rotated together with the rotary member makes it difficult to increase the speed of rotation, and thus it takes time for the cutting tool and the rotary member to rotate. As a result, it takes time to strip the film of the wire material.

In view of the above problem, an object of the present invention is to provide a stripping apparatus and a stripping station that reduce cycle time for steps of stripping insulation coating from a conducting wire material.

To achieve the above object, a stripping apparatus (e.g., a stripping apparatus 10) configured to strip an insulation coating (e.g., an insulation coating WL described below) from a conducting wire material (e.g., a conducting wire material W described below) the cross-section of which orthogonal to the longitudinal direction has a rectangular shape is provided, the stripping apparatus including: an upper mold (e.g., an upper mold 150 described below) provided with a stripping blade (e.g., a punch 153 described below) configured to strip the insulation coating; a lower mold (e.g., a lower mold 110 described below) configured to support the conducting wire material from the lower side thereof; a pressing member (e.g., a pressing member 130 described below) configured to prevent displacement of the conducting wire material; and a rotation mechanism (e.g., a workpiece rotation mechanism 21 described below) configured to rotate the conducting wire material around the rotational axis (e.g., a rotational axis C1 described below) that is parallel to the axial center of the conducting wire material.

With this configuration, the conducting wire material is rotated by a predetermined angle during the process of stripping the insulation coating, thus only the stroke time for moving the upper mold and the time for rotating the conducting wire material are included in a standby time in which no processing is performed, thereby reducing the cycle time. In other words, the time for rotating the conducting wire material by a predetermined angle is shorter than the time for feeding one conducting wire material in the axial direction thereof. As described above, the stripping device according to the disclosure rotates the conducting wire material by a predetermined angle instead of feeding the conducting wire material in the axial direction, thereby reducing the cycle time for the process of stripping the insulation coating of a conducting wire material.

The stripping blade has a substantially rectangular parallelepiped shape, and at least a pair of two opposing faces of the stripping blade have a stripping function to strip the insulation coating, and the two opposing faces having the stripping function are configured to simultaneously strip two of the conducting wire materials of insulation coatings. With this configuration, two conducting wire materials can be processed simultaneously, thereby enhancing processing efficiency.

The pressing member includes: a side-surface pressing member configured to change the holding width in the side surface width direction of the conducting wire material according to the side surface width of the conducting wire material; and an upper-surface pressing member configured to change the holding width in the vertical direction of the conducting wire material according to the vertical width of the conducting wire material.

In the case where the cross-section of the conducting wire material has a rectangular shape for example, the width dimension in the cross-sectional direction of the conducting wire material varies when the conducting wire material is rotated, and the distance between the side-surface pressing member and the conducting wire material also varies. In addition, the width dimension in the vertical direction (height dimension) of the conducting wire material varies, and the distance between the upper-surface pressing member and the conducting wire material also varies. Nevertheless, the conducting wire material can be reliably positioned and fixed even when the width dimensions of the conducting wire material vary, since the side-surface pressing members and the upper-surface pressing member are movable.

The stripping apparatus further includes a driving mechanism configured to urge the side-surface pressing member in the direction in which the side-surface pressing member comes into contact with the conducting wire material. With this configuration, the driving mechanism causes the side-surface pressing member to come into contact with the conducting wire material, whereby the position of the conducting wire material can be easily fixed even when the conducting wire material has a different width.

The upper-surface pressing member is joined to the upper mold through an elastic member. This enables the upper-surface pressing member to move in the vertical direction by utilizing the strokes of the upper mold to be separated from/approach the lower mold. At this time, even when the upper mold continues to approach the lower mold, the movement of the upper-surface pressing member can be stopped at the position where the upper-surface pressing member comes into contact with the conducting wire material by utilizing the elasticity of the spring. This eliminates the need for a driving mechanism, such as a servo motor.

A stripping station is also provided including: a plurality of stripping molds each including the upper mold, the lower mold, and the pressing member described above, and the stripping molds are aligned in the axial direction of the conducting wire material. This makes it possible to simultaneously strip a plurality of places of the conducting wire material, thereby enhancing processing efficiency.

The present invention can provide a stripping apparatus and a stripping station capable of reducing cycle time for steps of stripping the insulation coating of a conducting wire material.

DETAILED DESCRIPTION OF THE INVENTION

Figure 1:
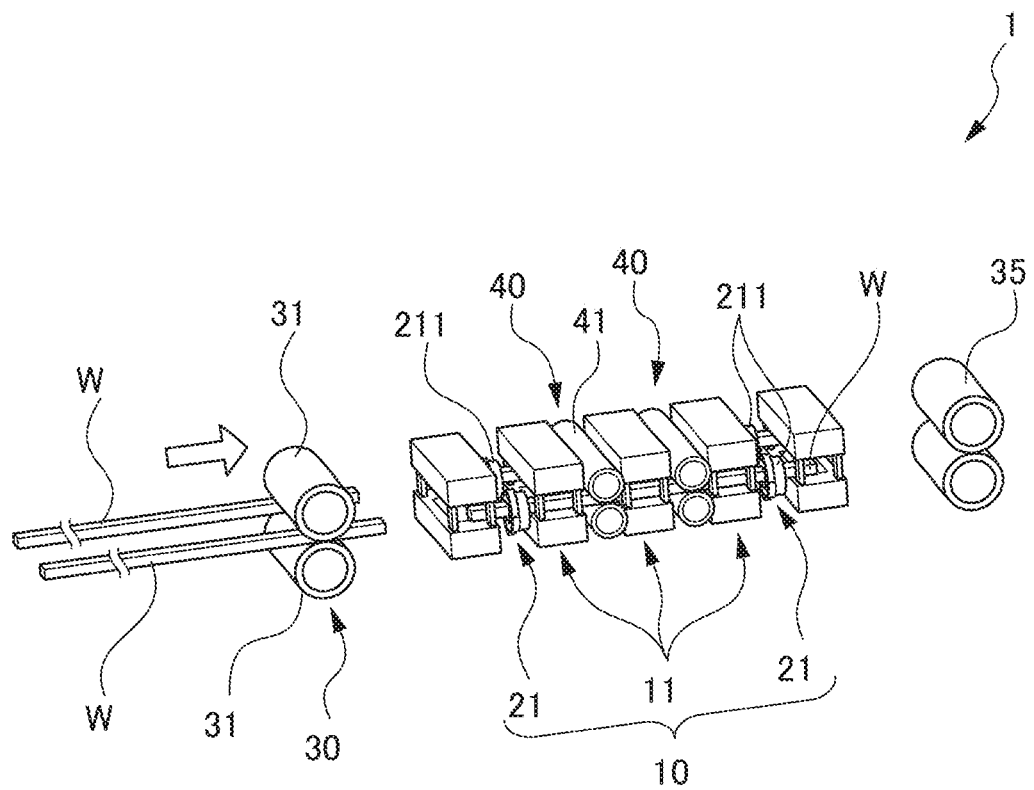
FIG. 1 is a schematic view of a stripping station according to an embodiment of the invention.
Figure 2:
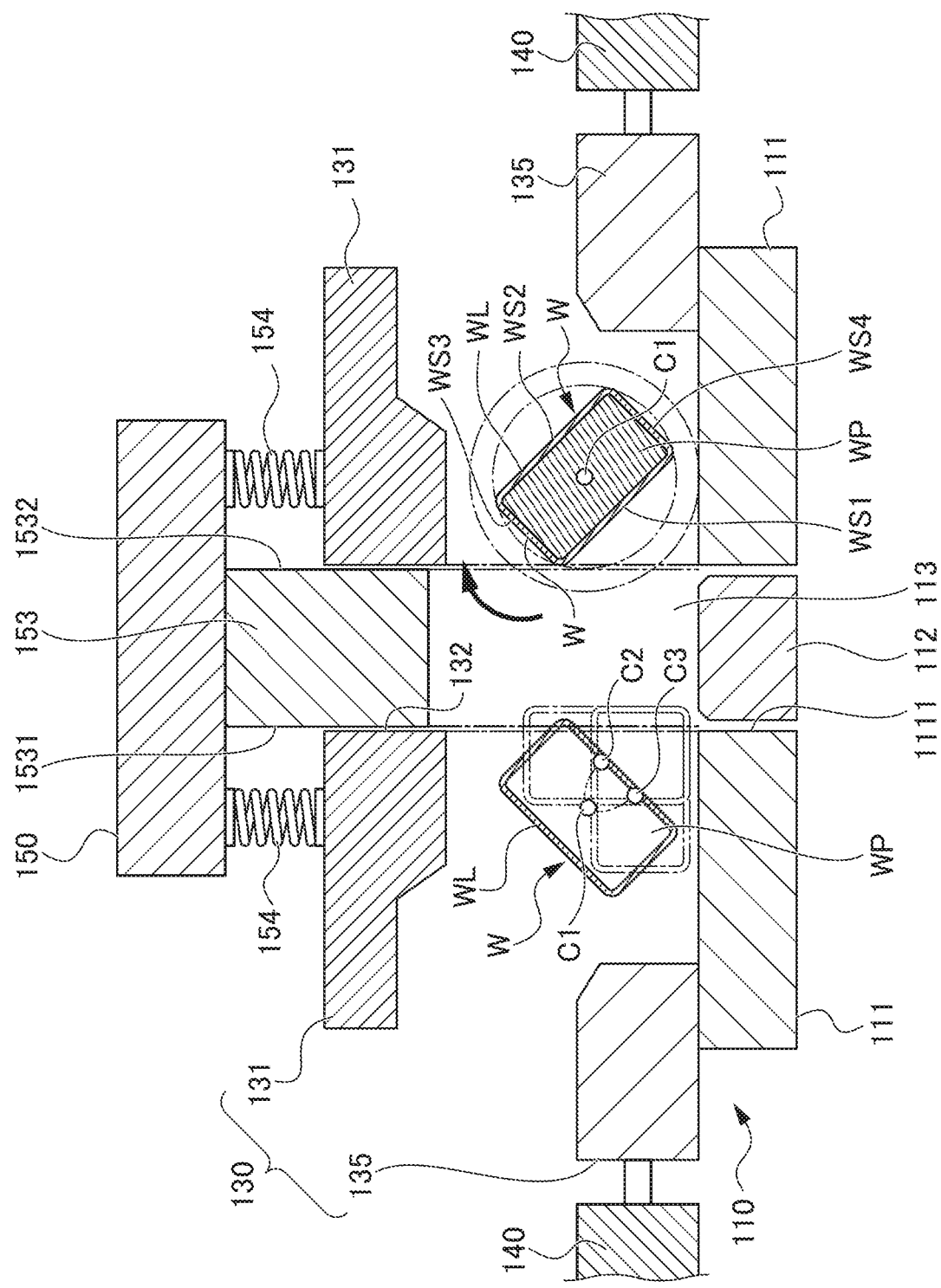
FIG. 2 is a schematic sectional view of a stripping apparatus according to an embodiment of the invention.
Figure 3:
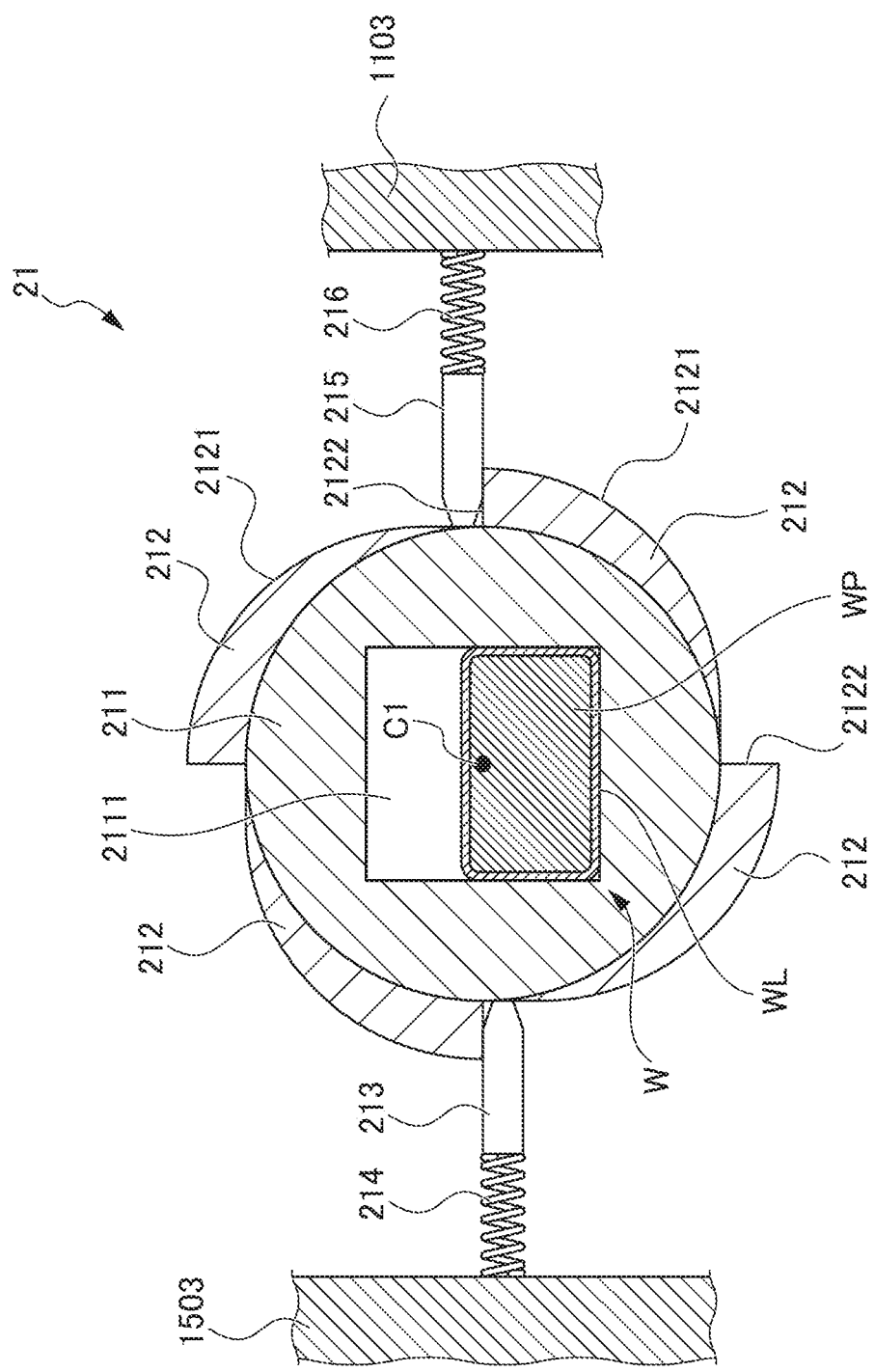
FIG. 3 is a schematic sectional view of a workpiece rotation mechanism of the stripping apparatus according to an embodiment of the invention.
Figure 4:
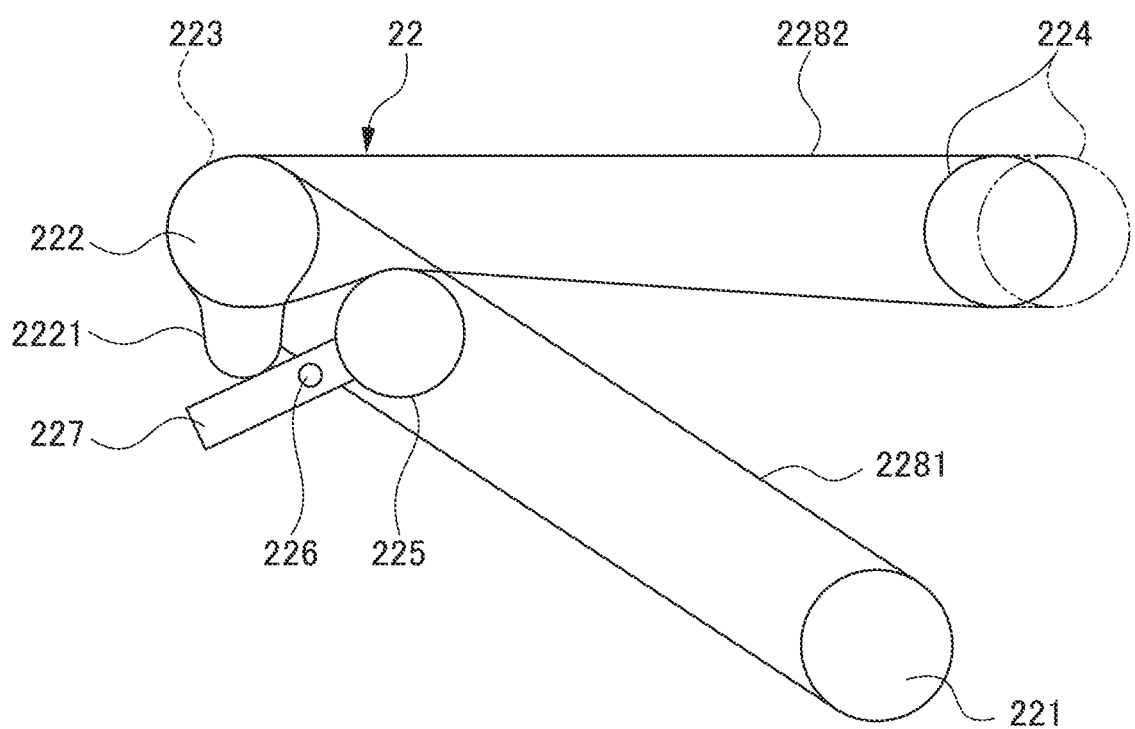
FIG. 4 is a schematic sectional view of an eccentric mechanism of the workpiece rotation mechanism of the stripping apparatus according to an embodiment of the invention.

Embodiments of the invention is described below with reference to the drawings. FIG. 1 is a schematic view of a stripping station according to an embodiment of the invention. FIG. 2 is a schematic sectional view of a stripping apparatus according to an embodiment of the invention. FIG. 3 is a schematic sectional view of a workpiece rotation mechanism of the stripping apparatus according to an embodiment of the invention. FIG. 4 is a schematic sectional view of an eccentric mechanism of the workpiece rotation mechanism of the stripping apparatus according to an embodiment of the invention. Referring to FIG. 1, a stripping station 1 of this embodiment is used for manufacturing a coil segment which is obtained by stripping the insulation coating WL at both ends of a long workpiece that is the conducting wire material W for a coil that is coated with the insulation coating WL.

A rectangular wire is used as the conducting wire material W. Referring to FIG. 2 and the like, the cross-section of each of the conducting wire materials W (the section orthogonal to the longitudinal direction of the conducting wire material W) has a rectangular shape. Each of the conducting wire materials W includes a first side surface WS1 and a second side surface WS2 respectively corresponding to the long sides of the rectangular shape and a third side surface WS3 and a fourth side surface WS4 respectively corresponding to the short sides of the rectangular shape. Each of the conducting wire materials W includes a conductive part WP formed of copper or the like and an insulation coating WL covering the periphery of the conductive part WP. Each of the conducting wire materials W are stripped of the insulation coating WL and are cut into a predetermined length suitable for a coil segment by the stripping station 1. A large number of the conducting wire materials W are in stock while being aligned by a palletizing device (not shown).

Referring to FIG. 1, the stripping station 1 includes a stripping apparatus 10 with five stripping molds 11 and workpiece rotation mechanisms 21, an upstream roller 30, a downstream roller 35, and intermediate rollers 40. As described above, the conducting wire materials W are cut to a predetermined length suitable for a coil segment, and a number required for manufacturing a coil of the conducting wire materials W each having one of the four predetermined lengths are prepared in advance.

The stripping station 1 includes five stripping molds 11 arranged between the upstream roller 30 and the downstream roller 35 in the direction which is the axial direction of the conducting wire materials W and in which the conducting wire materials W are fed (hereinafter referred to as "feeding direction"). Supporting members 211 of one of the workpiece rotation mechanisms 21 (described below) are disposed between the first one and the second one of the stripping molds 11 counted from the upstream side in the feeding direction, and supporting members 211 of the other one of the workpiece rotation mechanisms 21 are disposed between the fourth one and the fifth one of the stripping molds 11 counted from the upstream side of the feeding direction. One of the intermediate rollers 40 is disposed between the second one and the third one of the stripping molds 11 counted from the upstream side in the feeding direction, and the other one is disposed between the third one and the fourth one of the stripping molds 11 counted from the upstream side. The conducting wire materials W are inserted into the first one of the stripping molds 11, counted from the upstream side, respectively penetrate through holes 2111 of the supporting members 211 (described below) of one of the workpiece rotation mechanisms 21 on the upstream side in the feeding direction, pass through the three stripping molds 11, respectively penetrate through holes 2111 of the supporting members 211 (described below) of the other one of the workpiece rotation mechanisms 21 on the downstream side in the feeding direction, and pass through and are fed out from the fifth one of the stripping molds 11 counted from the upstream side.

The upstream roller 30 includes a pair of rollers 31. The rotation of the pair of rollers 31 allows the conducting wire materials W to pass between the pair of rollers 31 and to be fed to the respective supporting members 211 of one of the workpiece rotation mechanisms 21 through the first one of the stripping molds 11 counted from the upstream side. The downstream roller 35 includes a pair of rollers 36. The rotation of the pair of rollers 36 allows the conducting wire materials W to pass through the fifth one of the stripping molds 11 counted from the upstream side from the supporting members 211 of the other one of the workpiece rotation mechanisms 21 and be sent out from between the pair of rollers 36.

Each of the intermediate rollers 40 includes a pair of rollers 41. The rotation of the pair of rollers 41 allows the conducting wire materials W to pass between the pair of rollers 41 and to be fed to one of the stripping molds 11 on the downstream side of the pair of rollers 41 in the feeding direction.

Referring to FIG. 3, the workpiece rotation mechanism 21 includes a supporting member 211, protrusions 212, a rotational pin 213, a spring 214 as a rotational-pin urging member, a fixed pin 215, and a spring 216 as a fixed-pin urging member, and rotates the conducting wire material W by a predetermined angle around a rotational axis C1 that is parallel to the axial center of the conducting wire material W in synchronization with the upward movement of the upper molds 150 (described below) of the stripping molds 11.

Specifically, the supporting member 211 has a cylindrical outer shape, and has a circular shape in the cross-section orthogonal to the axial center of the supporting member 211 as shown in FIG. 3. The supporting member 211 is supported by a lower mold 110 such that the axial center of the supporting member 211 is movable. The movement of the axial center of the supporting member 211 is performed by an eccentric mechanism (described later).

The supporting member 211 includes a square-shaped through hole 2111 at the center thereof. The through hole 2111 penetrates the supporting member 211 in the feeding direction, and into which the conducting wire material W, which has been fed from the upstream roller 30, is inserted. Accordingly, the upstream ends of the two conducting wire materials W are respectively inserted into the two supporting members 211 disposed upstream of the five stripping molds 11 in the feeding direction, and the downstream ends of the two conducting wire materials W are respectively inserted into the two supporting members 211 disposed downstream of the five stripping molds 11 in the feeding direction, whereby the two conducting wire materials W are supported in parallel, and the conducting wire materials W supported in parallel are subjected to stripping of the insulation coatings WL performed by the stripping molds 11.

The length of one side of the through hole 2111 shown in FIG. 3 is slightly longer than the long sides of the rectangular shape of the conducting wire material W. The conducting wire material W inserted into the through hole 2111 is held by the supporting member 211 in a state in which the conducting wire material W is movable inside the through hole 2111 with respect to the supporting member 211 but is non-rotatable with respect to the supporting member 211. The supporting member 211 is supported in a rotatable manner integrally with the conducting wire material W around the rotational axis C1 that is the axial center of the supporting member 211, while supporting the conducting wire material W in the through hole 2111.

The workpiece rotation mechanism 21 includes an eccentric mechanism 22. When the supporting member 211 rotates integrally with the conducting wire material W, the eccentric mechanism 22 temporarily moves the supporting member 211 such that the axial center of the supporting member 211 is decentered to axial centers C2, C3 from the axial center position at the time of stripping the insulation coating WL of the conducting wire material W, as described below. Since the supporting member 211 is temporarily moved by the eccentric mechanism 22, the conducting wire material W can rotate without contacting die 111 of the stripping molds 11, side-surface pressing members 135, and the like (described below).

Specifically, the eccentric mechanism 22 includes a plurality of belts 2281, 2282, a plurality of pulleys 221, 222, 223, 224, and a belt pressing pulley 225 (see FIG. 4). The belt 2281 is wound around the pulley 221 and the pulley 222, and the belt 2282 is wound around the pulley 223 and the pulley 224.

The pulley 224 is provided on the supporting member 211 such that the pulley 224 is rotatable with respect to the supporting member 211 and the axial center of the pulley 224 is movable integrally with the supporting member 211. The pulley 222 and the pulley 223 are fixed to the same rotation shaft and rotate integrally with each other. The pulley 223 includes a cam 2221 at a position outside the belt 2282. The cam 2221 protrudes from a part of the circumference of the pulley 222 in the radially outward direction of the pulley 222. The pulley 221 is connected to the output shaft of a rotation power device, such as a motor (not shown), and is rotated by driving such a rotation power device.

The belt pressing pulley 225 is rotatably supported by one end of a swinging member 227 swingable around a swinging shaft 226, and the circumferential surface of the belt pressing pulley 225 is in contact with the belt 2282. The other end of the swinging member 227 can come into contact with the cam 2221. As the pulley 222 rotates and the cam 2221 comes into contact with the swinging member 227, the swinging member 227 rotates around the swinging shaft 226, so that the belt pressing pulley 225 presses the belt 2282 upward in FIG. 4, thereby moving the pulley 224 and the supporting member 211 in a direction toward the rotation shaft of the pulley 222 (in the direction from the pulley 224 indicated by a chain double-dashed line to the pulley 224 indicated by a solid line). This moves the conducting wire material W supported by the supporting member 211 away from the die 111 and conducting-wire-material abutting walls 113, so that the supporting member 211 can be rotated by the rotational pin 213 while supporting the conducting wire material W.

Referring to FIG. 3 and the like, four protrusions 212 are provided on the circumferential surface of the supporting member 211, and each of the protrusions 212 protrudes from the circumferential surface of the supporting member 211 in the radially outward direction of the supporting member 211. The four protrusions 212 have the same shape and are provided at intervals of a center angle of 90° around the rotational axis C1 of the circular supporting member 211 shown in FIG. 3. One of the protrusions 212 is provided in the center angle range of from 0° to 90° of the supporting member 211 shown in FIG. 3 (in a range from 12 o'clock to 3 o'clock, considering the circular supporting member 211 shown in FIG. 3 as the face of a clock), in which the protruded amount of the supporting member 211 in the radially outward direction gradually increases as the center angle approaches 0° (at the 12 o'clock position) from 90°, and is the smallest (i.e. approximately zero) at the center angle of 90° (at the 3 o'clock position) and the largest at the center angle of 0° (at the 12 o'clock position). In the same manner, the other protrusions 212 are provided in a center angle range of from 360° (0°) to 270° (9 o'clock position), a center angle range of from 270° to 180° (6 o'clock position), and a center angle range of from 180° to 90° of the supporting member 211 shown in FIG. 3, in which the protruded amount gradually increases as the center angle becomes smaller, in the same manner as in the center angle range of from 90° to 0°. The supporting members 211 included in the stripping apparatus 10 have the same shape. In other words, while the supporting member 211 shown in FIG. 3 rotates clockwise, each of the protrusions 212 has a pin sliding surface 2121 extending radially outwardly, away from the rotational axis C1 of the supporting member 211 gradually from the downstream side to the upstream side of the rotation direction of the conducting wire material W.

Each of the protrusions 212 includes a pin engagement part 2122. Specifically, the upstream end of the pin sliding surface 2121 in the rotation direction of the supporting member 211 is the end of each of the four protrusions 212, which are provided on the circumferential surface of the supporting member 211, and is connected to the surface directing radially inwardly of the supporting member 211 to form a corner part. Each of the protrusions 212 at the corner part has a shape falling radially inwardly of the supporting member 211 and being cut away (a cut-away shape), and the cut-away shaped part forms the pin engagement part 2122. The pin engagement part 2122 can be engaged with the rotational pin 213 or a fixed pin 215 as shown in FIG. 3.

The rotational pin 213 is supported by the upper mold 150 of the stripping mold 11 so as to move back and forth with respect to the supporting member 211, and moves vertically in synchronization with the vertical movement of the upper mold 150 of the stripping molds 11. Specifically, as shown in FIG. 3, the tip end of the rotational pin 213 has a truncated cone shape, and the base part thereof has a cylindrical shape. The base end of the base part is fixed with one end of the spring 214 serving as a rotational-pin urging member. The other end of the spring 214 is fixed to a holder 1503 provided on the upper mold 150. The spring 214 urges the rotational pin 213 toward the supporting member 211. Thus, the tip end of the rotational pin 213 abuts against and slides on the pin sliding surface 2121 of one of the protrusions 212 of the supporting member 211, or is engaged with the pin engagement part 2122. The rotational pin 213 is supported by the holder 1503 provided on the upper mold 150 so as to move up and down integrally with the upper mold 150.

The fixed pin 215 is supported by the lower mold 110 of the stripping mold 11 so as to move back and forth with respect to the supporting member 211, and the vertical position of the fixed pin 215 is fixed relative to the lower mold 110 of the stripping mold 11 and the supporting member 211. Specifically, the tip end of the fixed pin 215 has a truncated cone shape, and the base part thereof has a cylindrical shape. The base end of the base part is fixed with one end of the spring 216 serving as a fixed-pin urging member. The other end of the spring 216 is fixed to a holder 1103 provided on the lower mold 110. The spring 216 urges the fixed pin 215 toward the supporting member 211. Thus, the tip end of the fixed pin 215 abuts against the pin sliding surface 2121 of the protrusion 212 of the supporting member 211, or is engaged with the pin engagement part 2122. As shown in FIG. 3, the fixed pin 215 is engaged with the pin engagement part 2122, thereby preventing counterclockwise rotation of the supporting member 211 in FIG. 3. The fixed pin 215 is supported by the holder 1103 of the lower mold 110 so that the fixed pin 215 can prevent the rotation of the supporting member 211 in a state in which the pin engagement part 2122 is engaged with the tip end of the fixed pin 215.

Each of the stripping molds 11 includes the lower mold 110, a pressing member 130, and an upper mold 150. The lower mold 110 includes a die 111 and a center guide 112. The die 111 extends in the axial direction of the conducting wire materials W, and includes a through hole 1111 penetrating the die 111 in the vertical direction. The die 111 extends in the axial direction of the conducting wire materials W, and the center guide 112 is disposed in the through hole 1111 penetrating the die 111 in the vertical direction. When a punch 153 of the upper mold 150 moves below the upper surface of the die 111, the center guide 112 moves in the vertical direction in synchronization with the movement of the punch 153.

Referring to FIG. 2, two conducting wire materials W, which are respectively supported by the supporting members 211, are disposed on the upper surface of the die 111 on both the sides of the through hole 1111. The die 111 of the lower mold 110 supports the lower sides of the conducting wire materials W. The conducting-wire-material abutting walls 113 extending in the vertical direction are provided on the upstream side and the downstream side in the feeding direction (the direction connecting the front surface and the back surface of the drawing plane of FIG. 2) of the center guide 112. The width in the direction orthogonal to both the feeding direction and the vertical direction (i.e. in the left-right direction in FIG. 2, hereinafter referred to as "cross-sectional direction") of each of the conducting-wire-material abutting walls 113 is equal to the width in the same direction of the through hole 1111, in which the center guide 112 is disposed, and the conducting wire materials W are pressed by the respective side-surface pressing members 135 against the side surfaces in the same direction of the conducting-wire-material abutting walls 113, at the time of stripping the insulation coatings WL of the conducting wire materials W.

The upper molds 150 of the five stripping molds 11 are connected to an upper mold driving unit including a cylinder, an actuator, and the like (not shown) such that all the five upper molds 150 can simultaneously move in the vertical direction with respect to the lower molds 110. The punch 153 serving as a stripping blade and a cutting blade to strip the insulation coating WL is fixed to the lower surface of each of the upper molds 150. Thus, the punch 153 moves integrally with the corresponding upper mold 150 in the vertical direction, which is the direction orthogonal to the axial direction of the conducting wire materials W.

The punch 153 has an approximately rectangular parallelepiped shape. A pair of two side surfaces 1531, 1532 in the left-right direction (cross-sectional direction) in FIG. 2 of the punch 153 are configured to simultaneously strip the insulation coatings WL of the conducting wire materials W placed on the die 111. In other words, each of the pair of two side surfaces 1531, 1532 in the left-right direction (cross-sectional direction) in FIG. 2 of the punch 153 moves downward along the side surface (any one of a first side surface WS1, a second side surface WS2, a third side surface WS3, and a fourth side surface WS4) of the conductive part WP of the corresponding rectangular shaped conducting wire material W to cut off and strip the insulation coating WL of the corresponding conducting wire material W. This cutting-off process is performed simultaneously with respect to the two conducting wire materials W placed on the respective die 111.

A pair of springs 154 as elastic members are provided with the upper ends thereof being fixed to the lower surface of the upper mold 150. The lower ends of the pair of springs 154 are fixed to the upper surface of the upper-surface pressing member 131 included in the pressing member 130, and the pair of springs 154 urge the upper-surface pressing member 131 in the downward direction with respect to the upper mold 150.

The pressing member 130 is provided to prevent displacement of the conducting wire materials W, and includes the upper-surface pressing member 131 and the side-surface pressing members 135. The upper-surface pressing member 131 is disposed above the conducting wire materials W, which are placed on the die 111, and below the upper mold 150, and is joined to the upper mold 150 through the springs 154 which are elastic members. The upper-surface pressing member 131 includes a through hole 132 and the through hole 132 is penetrated by the punch 153.

The lower end of the punch 153 is disposed to face the center guide 112 disposed in the through hole 1111 of the die 111 of the lower mold 110. As the upper mold 150 moves downward, the upper-surface pressing member 131 moves downward together with the upper mold 150. Then, the lower surface of the upper-surface pressing member 131 comes into contact with the conducting wire materials W and the conducting wire materials W are pressed downward by the urging force of the springs 154, so that the conducting wire materials W are positioned between the upper-surface pressing member 131 and the die 111, thereby preventing rotation of the conducting wire materials W around the respective axial centers.

Figure 5:
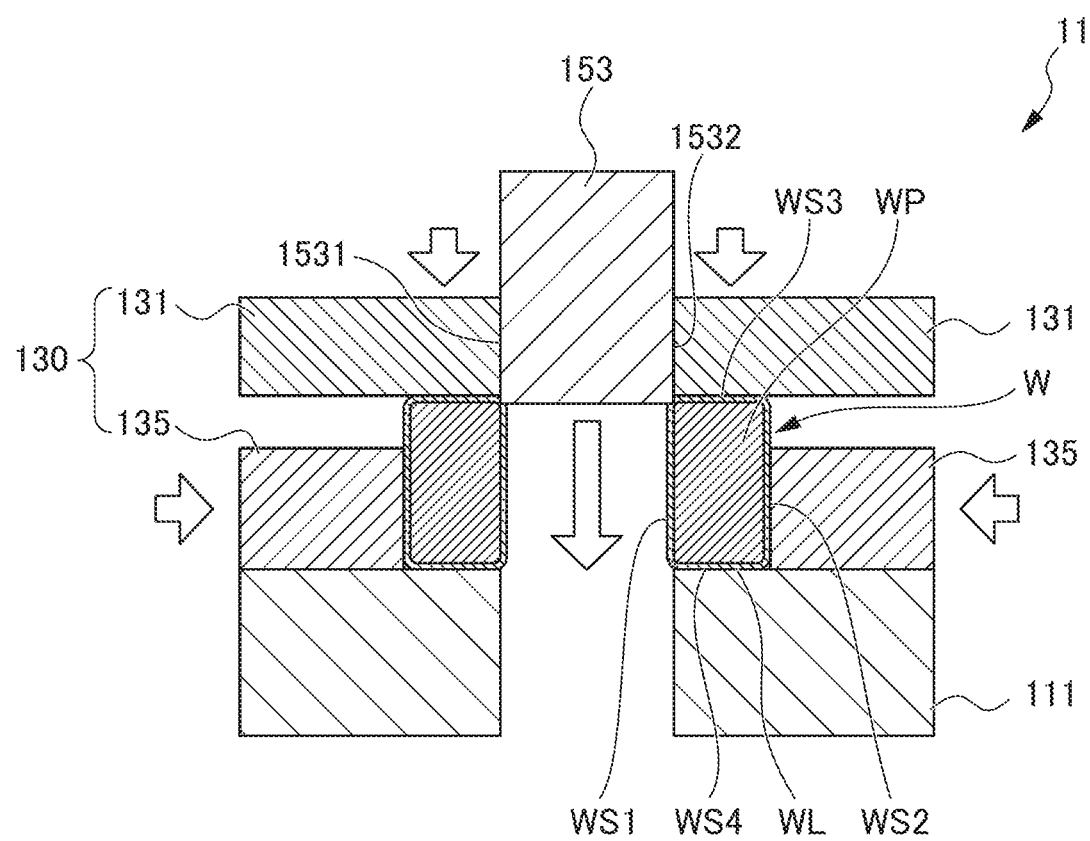
FIG. 5 is a schematic sectional view showing a state in which the stripping apparatus according to the an embodiment of the invention strips insulation coatings on first side surfaces of conducting wire materials.
Figure 6:
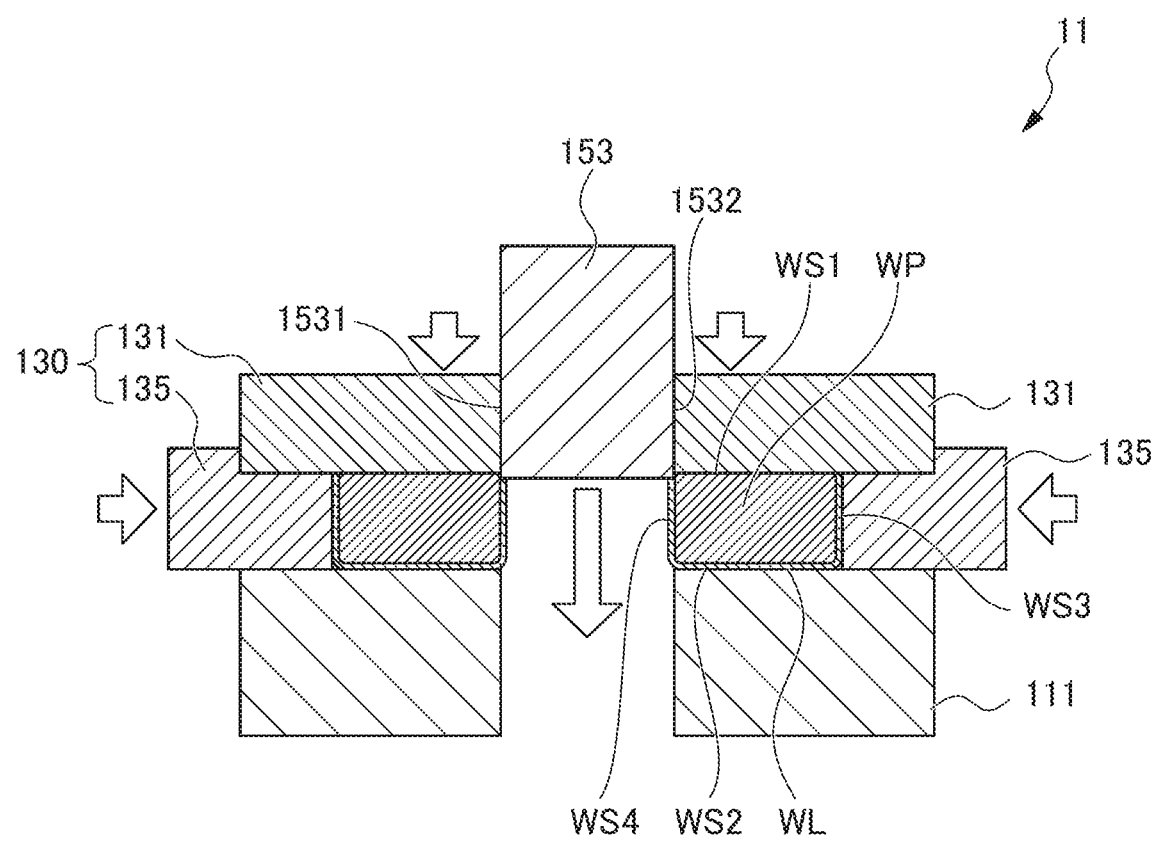
FIG. 6 is a schematic sectional view showing a state in which the stripping apparatus according to the an embodiment of the invention strips insulation coatings on fourth side surfaces of the conducting wire materials.

The upper-surface pressing member 131 can change the holding width of the conducting wire materials W in the vertical direction according to the vertical width of the conducting wire materials W. The vertical width of the conducting wire materials W varies depending on whether the conducting wire materials W are disposed so that the cross sections thereof are in a vertically long state as shown in FIG. 5 and the like or in a horizontally long state as shown in FIG. 6 and the like. Nevertheless, the upper-surface pressing member 131 can position the conducting wire materials W in the vertical direction corresponding to the state in which the cross-sections thereof are in a vertically long state or in a horizontally long state, since the upper-surface pressing member 131 is urged downward by the springs 154 with respect to the upper mold 150 and presses the conducting wire materials W from above so that the conducting wire materials W are positioned between the upper-surface pressing member 131 and the die 111.

A pair of side-surface pressing members 135 are provided in the feeding direction and the cross-sectional direction, and are respectively connected to driving mechanisms 140 including a cylinder, an actuator, and the like such that the side-surface pressing members 135 are slidable on the die 111 so as to be separated from/approach each other. The driving mechanisms 140 urge the respective side-surface pressing members 135 in a direction in which the side-surface pressing members 135 come into contact with the respective conducting wire materials W. The pair of side-surface pressing members 135 approach each other, and come into contact with and press the respective conducting wire materials W against the side surfaces of the conducting-wire-material abutting walls 113 so that the conducting wire materials W are positioned in the side surface width direction.

The side-surface pressing members 135 can change the holding width in the side surface width direction of the conducting wire materials W according to the side surface width of the conducting wire materials W. The side surface width of the conducting wire materials W (the width of the conducting wire materials in the cross-sectional direction in FIG. 5 and the like) varies depending on whether the conducting wire materials W are disposed so that the cross-sections thereof are in the vertically long state as shown in FIG. 5 and the like or in the horizontally long state as shown in FIG. 6 and the like. Nevertheless, the side-surface pressing members 135 can position the conducting wire materials W in the side surface width direction corresponding to the state in which the cross-sections thereof are in the vertically long state or in the horizontally long state, since the side-surface pressing members 135 press the respective conducting wire materials W against the side surfaces of the conducting-wire-material abutting walls 113 to position the conducting wire materials W.

Figure 7:
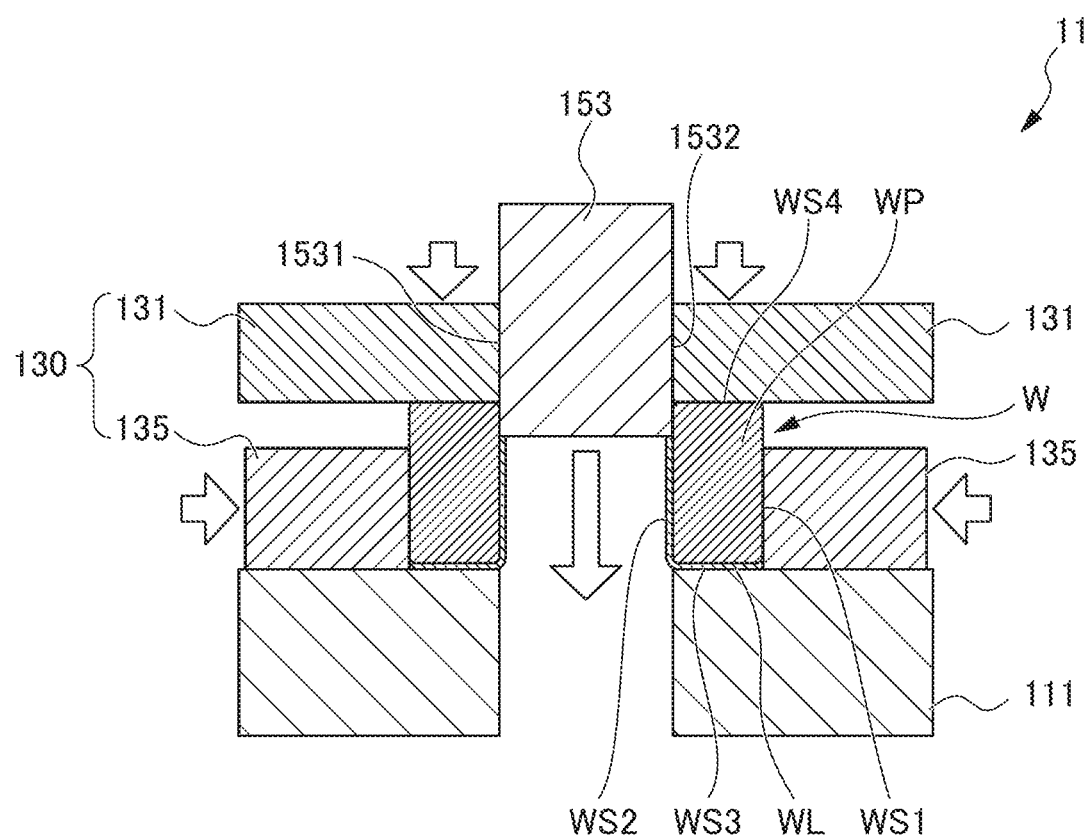
FIG. 7 is a schematic sectional view showing a state in which the stripping apparatus according to the an embodiment of the invention strips insulation coatings on second side surfaces of the conducting wire materials.
Figure 8:
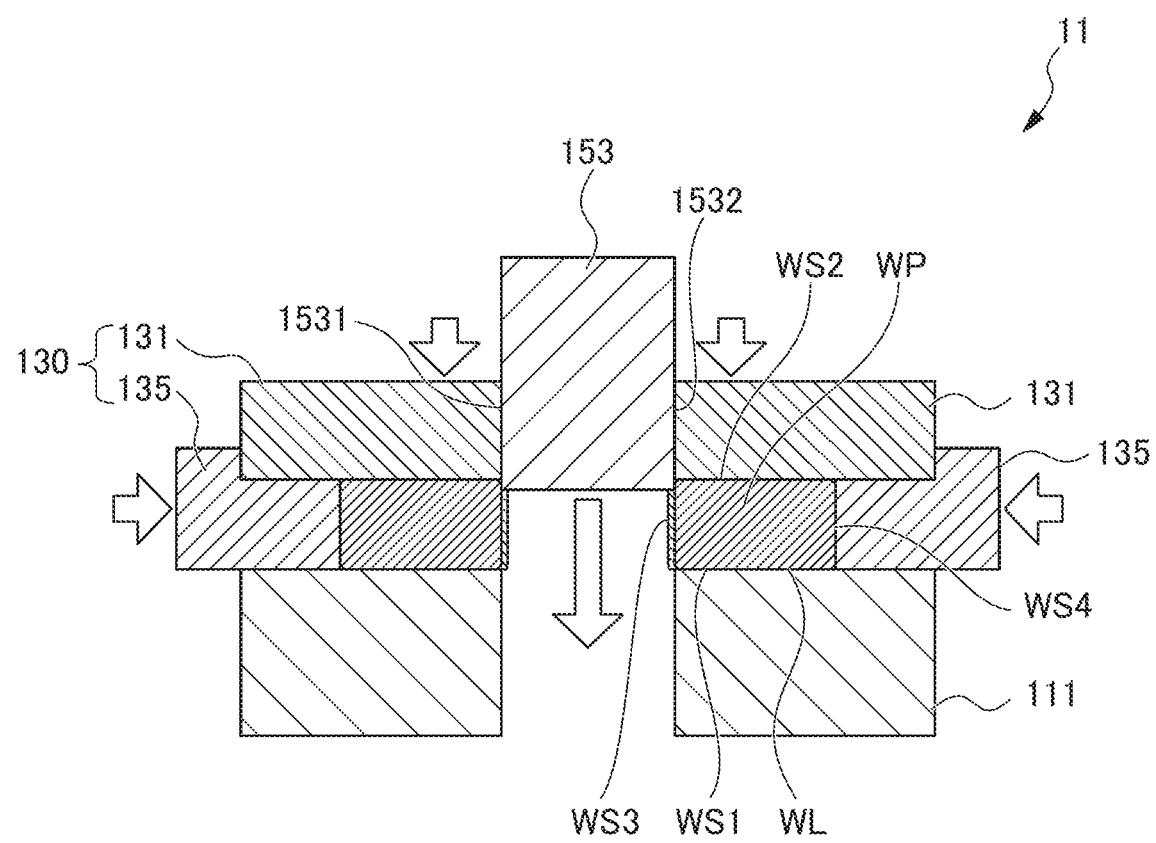
FIG. 8 is a schematic sectional view showing a state in which the stripping apparatus according to the an embodiment of the invention strips insulation coatings on third side surfaces of the conducting wire materials.
Figure 9:
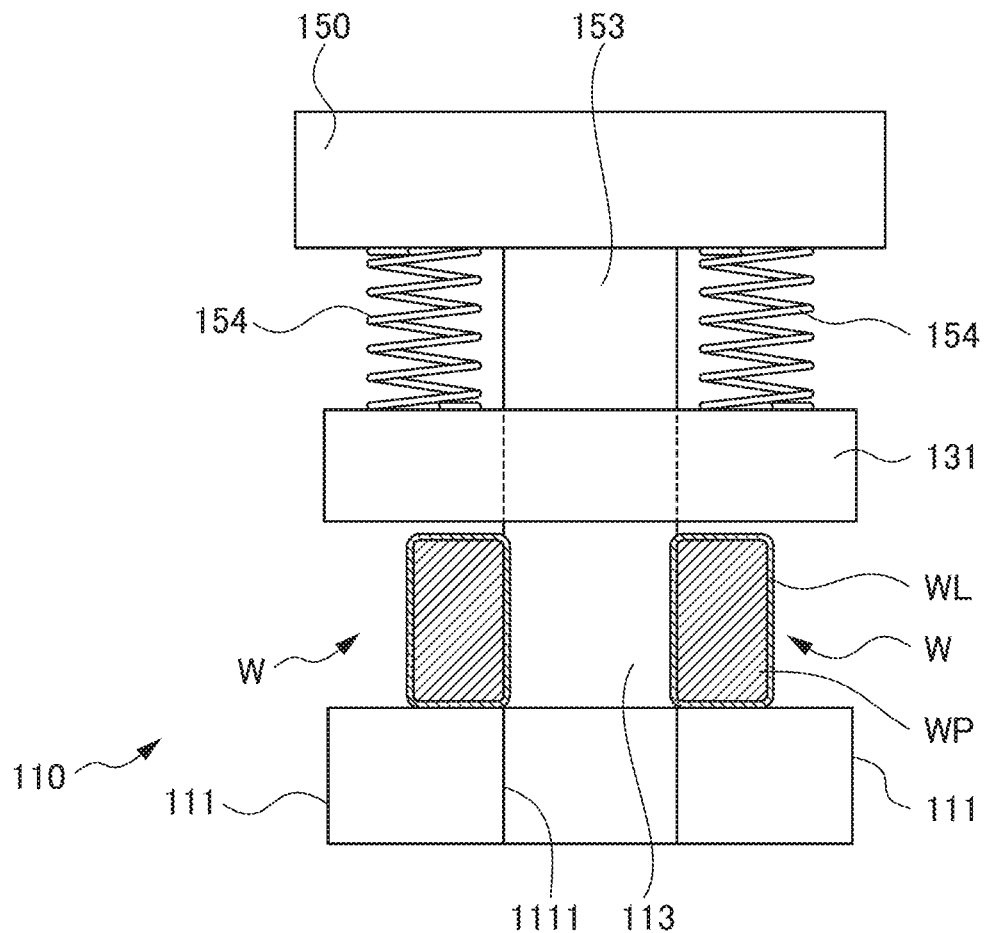
FIG. 9 is a schematic sectional view showing the state before positioning the conducting wire materials in the vertical direction when the stripping apparatus according to the an embodiment of the invention strips the insulation coatings on the first side surfaces of the conducting wire materials.
Figure 10:
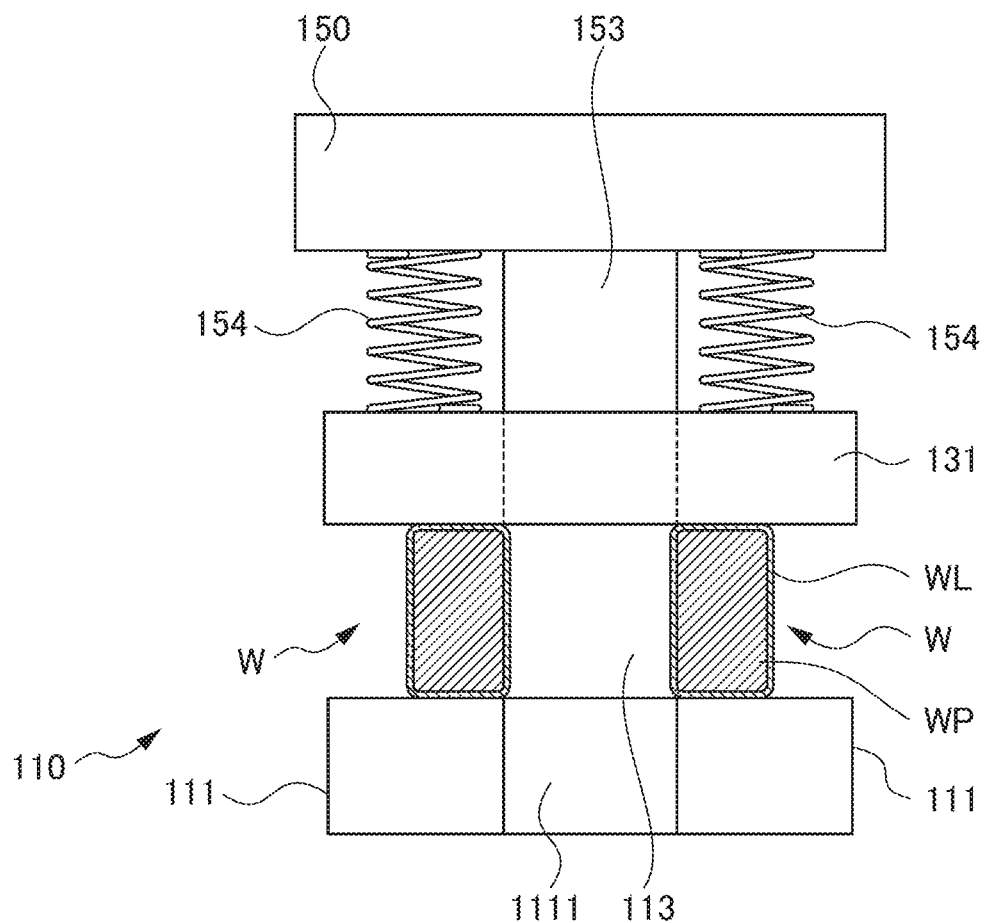
FIG. 10 is a schematic sectional view showing the state after positioning the conducting wire materials in the vertical direction when the stripping apparatus according to an embodiment of the invention strips the insulation coatings on the first side surfaces of the conducting wire materials.
Figure 11:
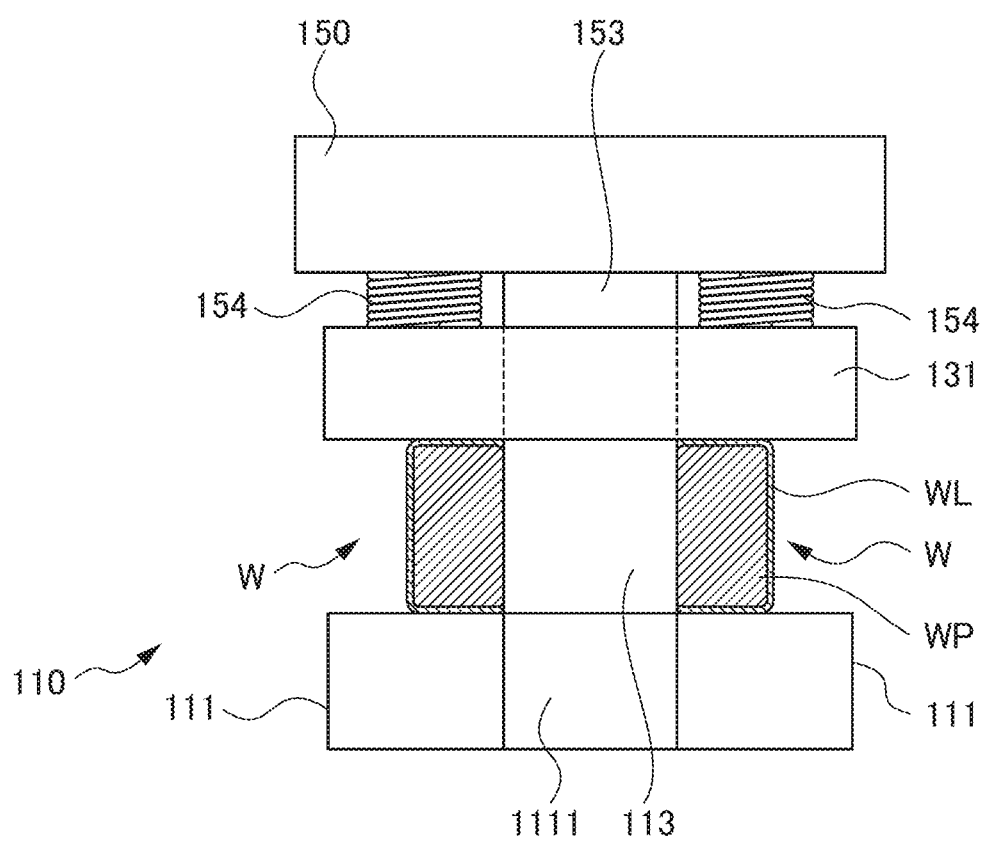
FIG. 11 is a schematic sectional view showing a state in which the insulation coatings on the first side surfaces of the conducting wire materials have been stripped by the stripping apparatus according to the an embodiment of the invention.

Steps to strip the insulation coatings WL of the conducting wire materials W are now described. A positioning step is first performed with respect to the stripping molds 11. FIG. 5 is a schematic sectional view showing a state in which the stripping apparatus according to an embodiment of the invention strips insulation coatings on first side surfaces of conducting wire materials. FIG. 6 is a schematic sectional view showing a state in which the stripping apparatus according to an embodiment of the invention strips insulation coatings on fourth side surfaces of the conducting wire materials. FIG. 7 is a schematic sectional view showing a state in which the stripping apparatus according to an embodiment of the invention strips insulation coatings on second side surfaces of the conducting wire materials. FIG. 8 is a schematic sectional view showing a state in which the stripping apparatus according to an embodiment of the invention strips insulation coatings on third side surfaces of the conducting wire materials. FIG. 9 is a schematic sectional view showing the state before positioning the conducting wire materials in the vertical direction when the stripping apparatus according to an embodiment of the invention strips the insulation coatings on the first side surfaces of the conducting wire materials. FIG. 10 is a schematic sectional view showing the state after positioning the conducting wire materials in the vertical direction when the stripping apparatus according to an embodiment of the invention strips the insulation coatings on the first side surfaces of the conducting wire materials. FIG. 11 is a schematic sectional view showing a state in which the insulation coatings on the first side surfaces of the conducting wire materials have been stripped by the stripping apparatus according to the an embodiment of the invention.

In the positioning step, as shown in FIG. 9 and the like, each of the conducting wire materials W is inserted into the through hole 2111 of the supporting member 211 (see FIG. 12 and the like) in a state in which the cross-section of the conducting wire material W is in the vertically longer state to be supported by the supporting member 211, and is placed on the upper surface of the die 111 of each of the stripping molds 11 so that the fourth side surface WS4 comes into contact with the upper surface of the die 111. Then, as shown in FIGS. 5 and 10, the side-surface pressing members 135 are respectively driven by the driving mechanisms 140 (see FIG. 2) such that each of the side-surface pressing members 135 comes into contact with the second side surface WS2 of the corresponding conducting wire material W, and presses the corresponding conducting wire material W against the conducting-wire-material abutting walls 113 while the first side surface WS1 comes into contact with the conducting-wire-material abutting walls 113 (see FIG. 2), so that each of the conducting wire materials W are held between the conducting-wire-material abutting walls 113 and the corresponding side-surface pressing member 135 to be positioned in the cross-sectional direction. Then, the upper mold driving unit (not shown) is driven to move each of the upper molds 150 downward such that the conducting wire materials W are held between the upper-surface pressing member 131 and the die 111 while the upper-surface pressing member 131 comes into contact with the first side surface WS1. This is the description of the positioning step.

Then, a stripping step is performed. In the stripping step, by further driving the upper mold driving unit (not shown), each of the upper molds 150 is moved downward to allow the punch 153 to be projected from the lower surface of the upper-surface pressing member 131. This causes the pair of two side surfaces in the cross-sectional direction of the punch 153 to start cutting the insulation coatings WL of the first side surfaces WS1, respectively. Then, the insulation coatings WL of the first side surfaces WS1 are cut off and stripped by moving the upper mold 150 downward until the punch 153 reaches the center guide 112 as shown in FIG. 11. This is the description of the stripping step.

Figure 12:
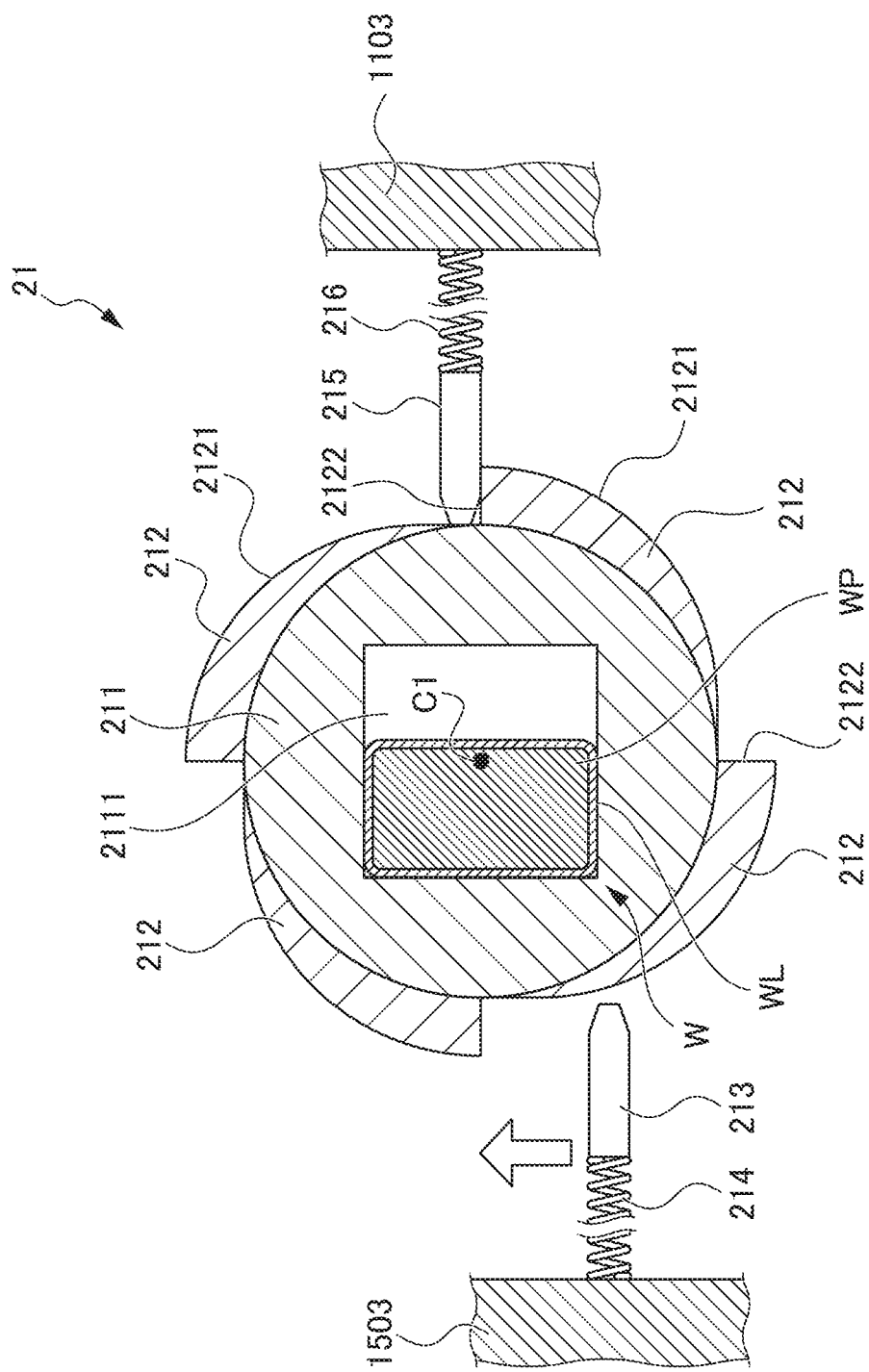
FIG. 12 is a schematic sectional view showing the state before rotating a supporting member of the workpiece rotation mechanism of the stripping apparatus according to an embodiment of the invention.
Figure 13:
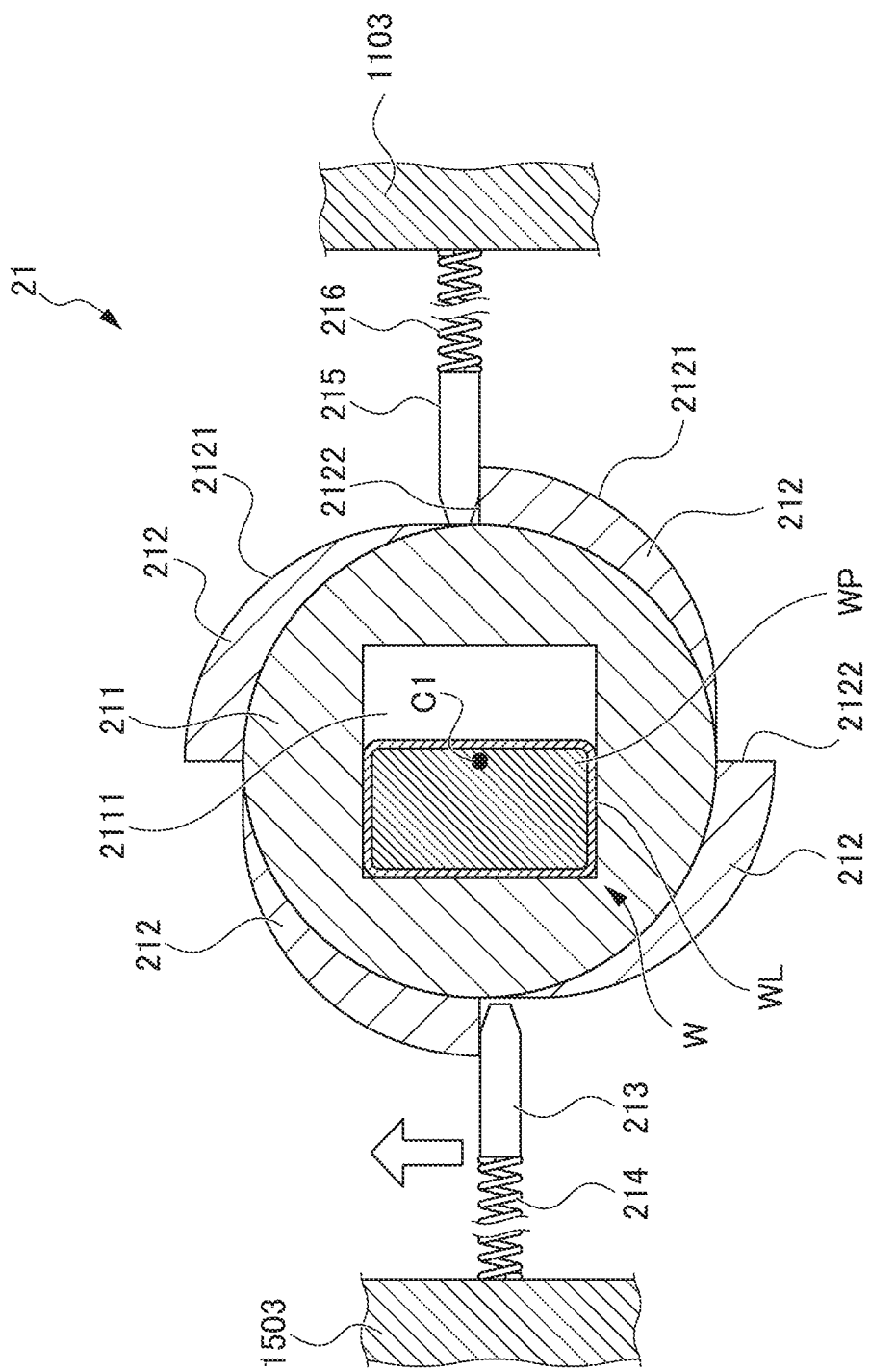
FIG. 13 is a schematic sectional view showing a state in which a rotational pin is engaged with a pin engagement part of a protrusion of the supporting member of the workpiece rotation mechanism of the stripping apparatus according to an embodiment of the invention.
Figure 14:
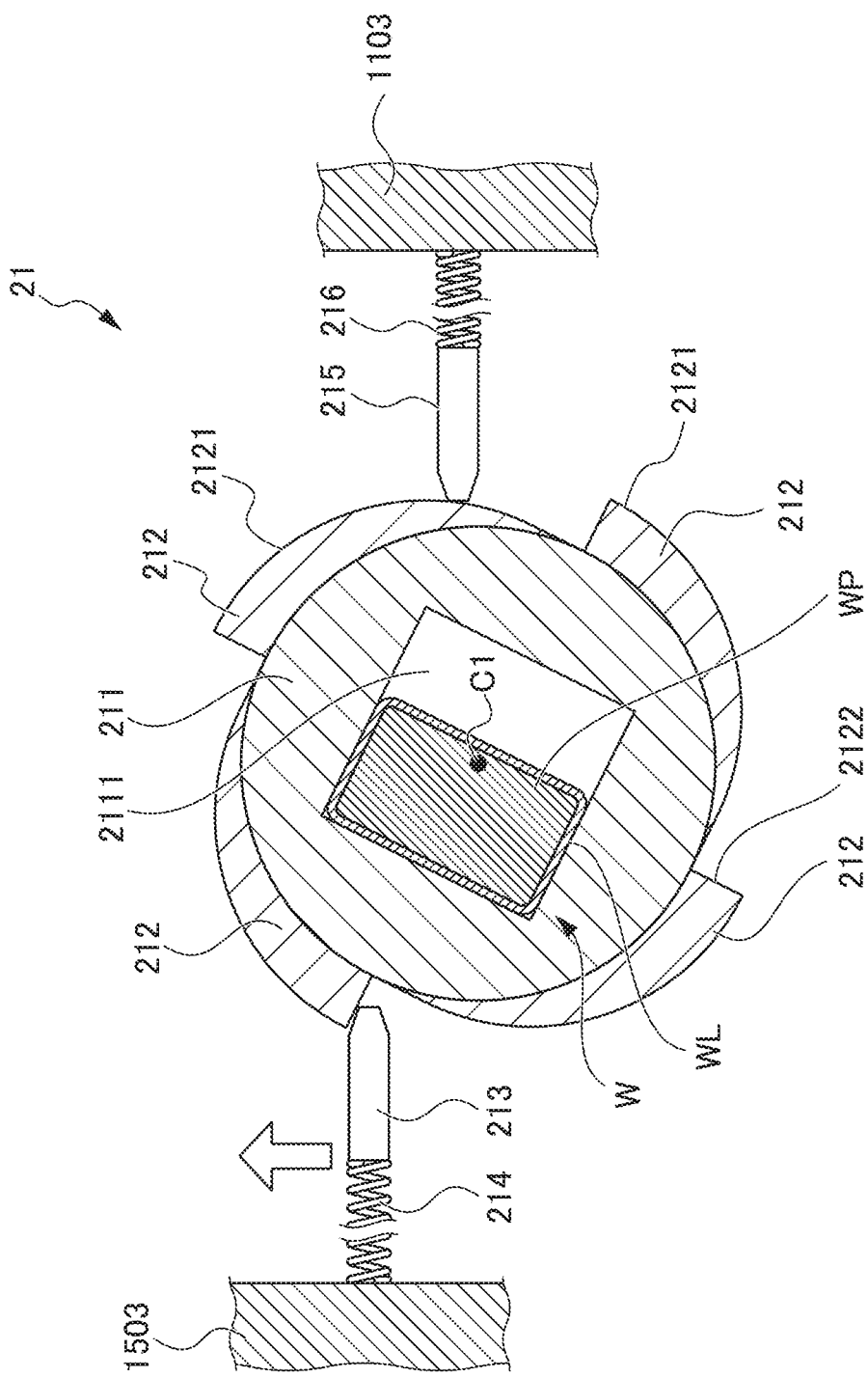
FIG. 14 is a schematic sectional view showing a state in which the rotational pin has started to rotate the supporting member of the workpiece rotation mechanism of the stripping apparatus according to the an embodiment of the invention.
Figure 15:
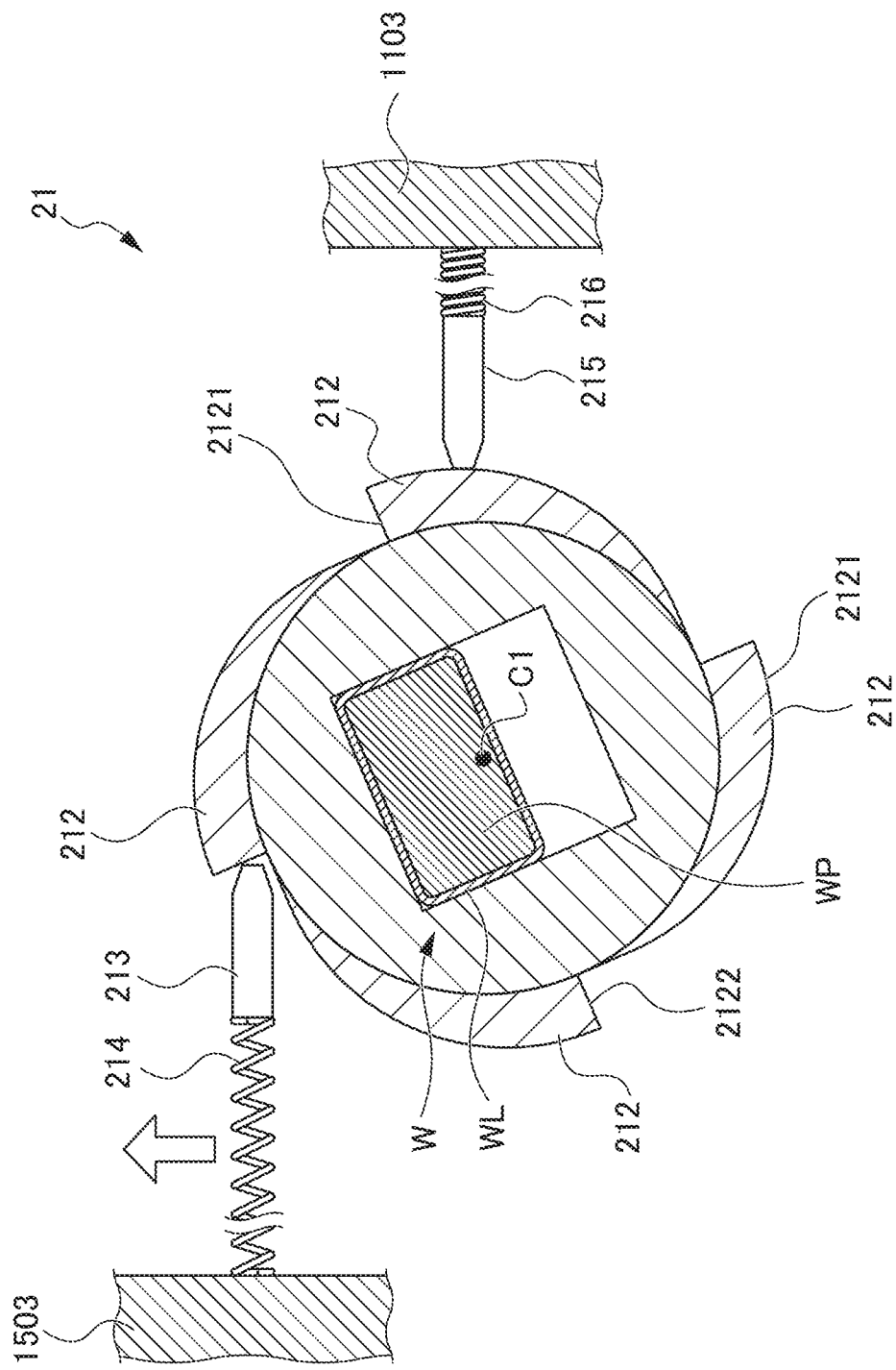
FIG. 15 is a schematic sectional view showing a state in which the rotational pin is about to finish rotating the supporting member of the workpiece rotation mechanism of the stripping apparatus according to an embodiment of the invention.
Figure 16:
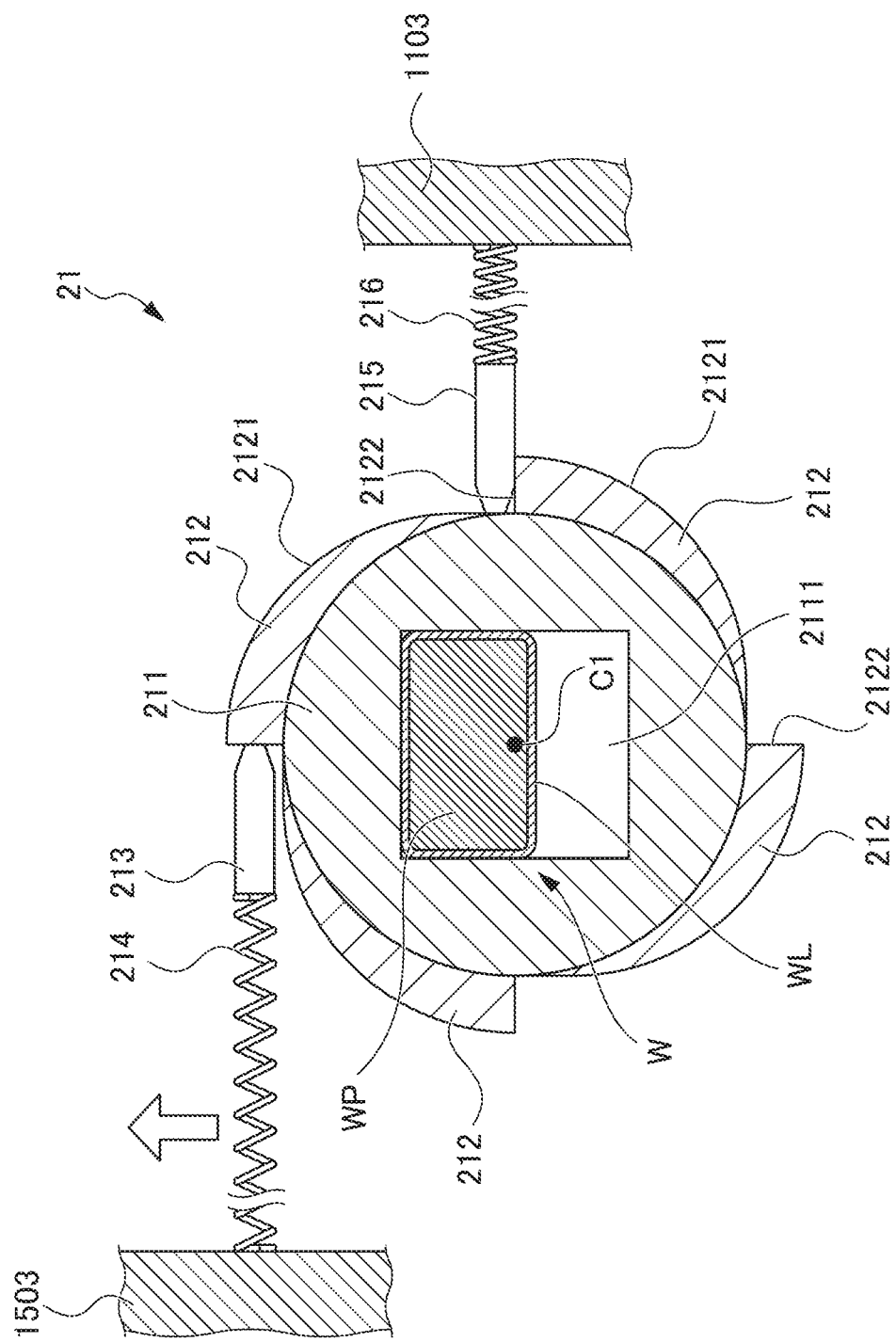
FIG. 16 is a schematic sectional view showing a state in which the rotational pin has finished rotating the supporting member of the workpiece rotation mechanism of the stripping apparatus according to the an embodiment of the invention.
Figure 17:
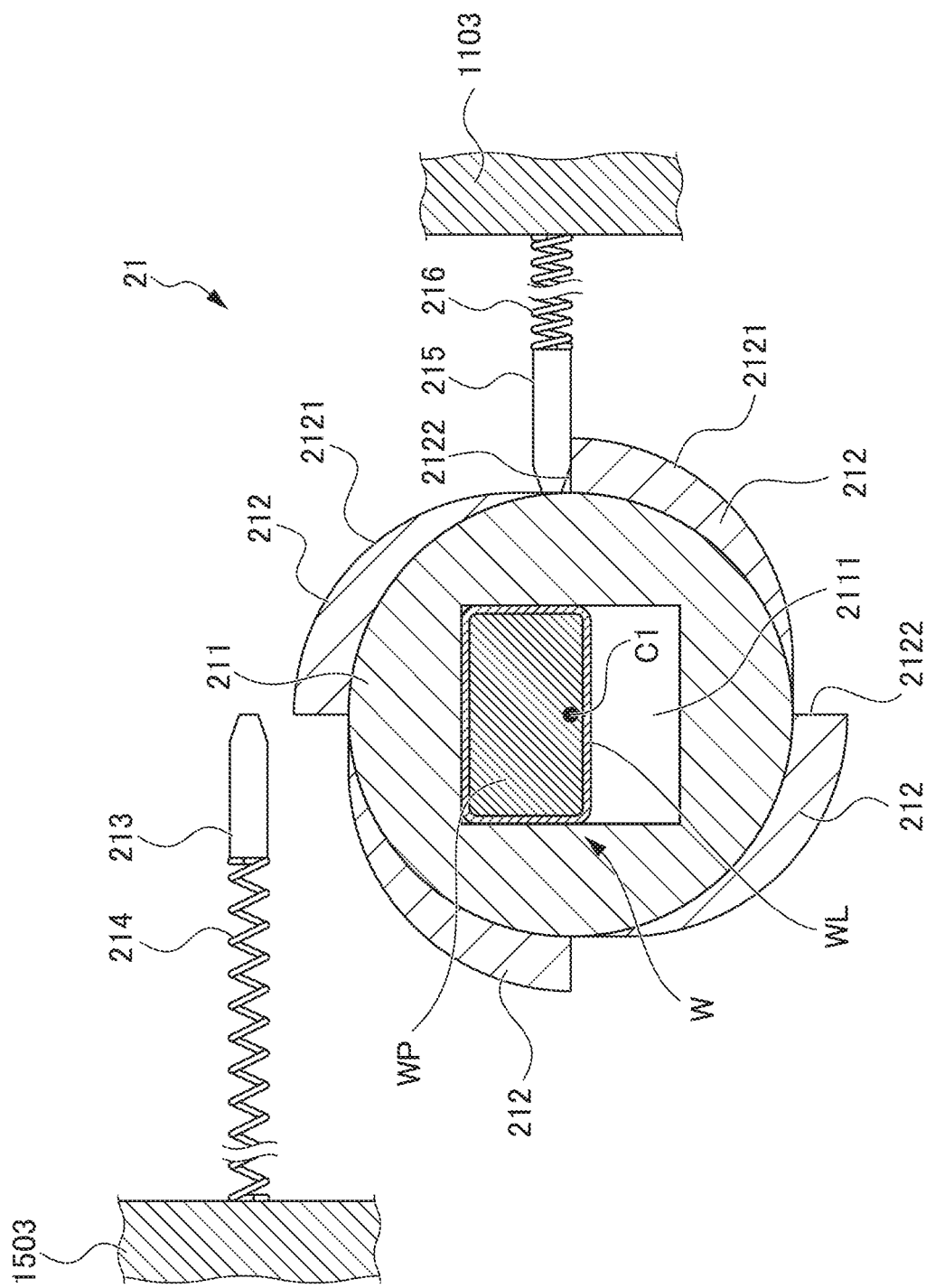
FIG. 17 is a schematic sectional view showing a state in which the rotational pin is at a position retracted from the supporting member after the rotational pin finished rotating the supporting member of the workpiece rotation mechanism of the stripping apparatus according to the an embodiment of the invention.

Then, a rotation step is performed. FIG. 12 is a schematic sectional view showing the state before rotating a supporting member of the workpiece rotation mechanism of the stripping apparatus according to an embodiment of the invention. FIG. 13 is a schematic sectional view showing a state in which a rotational pin is engaged with a pin engagement part of a protrusion of the supporting member of the workpiece rotation mechanism of the stripping apparatus according to an embodiment of the invention. FIG. 14 is a schematic sectional view showing a state in which the rotational pin has started to rotate the supporting member of the workpiece rotation mechanism of the stripping apparatus according to an embodiment of the invention. FIG. 15 is a schematic sectional view showing a state in which the rotational pin is about to finish rotating the supporting member of the workpiece rotation mechanism of the stripping apparatus according to an embodiment of the invention. FIG. 16 is a schematic sectional view showing a state in which the rotational pin has finished rotating the supporting member of the workpiece rotation mechanism of the stripping apparatus according to an embodiment of the invention. FIG. 17 is a schematic sectional view showing a state in which the rotational pin is at a position retracted from the supporting member after the rotational pin has finished rotating the supporting member of the workpiece rotation mechanism of the stripping apparatus according to an embodiment of the invention.

In the rotation step, the driving mechanisms 140 (see FIG. 2) are driven such that the pair of side-surface pressing members 135 are moved away from each other in the cross-sectional direction and separated from the second surfaces of the respective conducting wire materials W. Then, the upper mold 150, which has been moved downward until the punch 153 reaches the center guide 112, is moved upward. This moves the upper-surface pressing member 131 away from the third side surfaces of the conducting wire materials W, and also moves the rotational pin 213 upward as shown in FIG. 12. Then, the axial center position of each of the supporting members 211 is shifted by the eccentric mechanism 22 from the axial center position C2 (see FIG. 2) of the supporting member 211 in the stripping step to the axial center position C1.

The upper mold 150 is moved further upward, then the tip end of the rotational pin 213 is engaged with one of the pin engagement parts 2122, as shown in FIG. 13. Then, a further upward movement of the upper mold 150 causes the tip end of the rotational pin 213 to push one of the protrusions 212 upward as shown in FIG. 14, thereby rotating the supporting member 211. A still further upward movement of the upper mold 150 causes the supporting member 211 to rotate by 90° (one-fourth rotation) from the state shown in FIG. 13 (see FIGS. 15 to 16). Then, the upper mold 150 reaches the top dead center as shown in FIG. 9, whereby the engagement of the rotational pin 213 with the pin engagement part 2122 is released as shown in FIG. 17. Then, the axial center position of each of the supporting members 211 is shifted by the eccentric mechanism 22 from the axial center position C1 (see FIG. 2), around which the supporting member 211 has been rotated, to the axial center position C3. This is the description of the rotation step. After the rotation step, the second side surfaces WS2 of the conducting wire materials W are in contact with the upper surface of the die 111.

The positioning step, the stripping step, and the rotation step are repeated in the same manner as described above, whereby the insulation coatings WL of the fourth side surfaces WS4, the second side surfaces WS2, the third side surfaces WS3 of the conducting wire materials W are stripped in this order.

This embodiment achieves the following effects.

According to this embodiment, the stripping apparatus 10 configured to strip the insulation coatings WL of the conducting wire materials W, each including the insulation coatings WL and each of the cross-sections of which orthogonal to the longitudinal direction has a square shape, includes the upper molds 150 each having the punch 153 as a stripping blade for stripping the insulation coatings WL, the lower molds 110 supporting the conducting wire materials W from the lower side thereof, the pressing members 130 preventing displacement of the conducting wire materials W, and the workpiece rotation mechanisms 21 configured to rotate the conducting wire materials W around the rotational axes C1 parallel to the axial centers of the conducting wire materials W.

With this configuration, the conducting wire materials W as workpieces are rotated by a predetermined angle during the process of stripping the insulation coatings WL, thus only the stroke time for moving the molds 11 and the time for rotating the conducting wire materials are included in the standby time in which no processing is performed, thereby reducing the cycle time. In other words, the time for rotating a conducting wire material W by a predetermined angle is shorter than the time for feeding a conducting wire material W in the axial direction. As described above, the stripping device according to the embodiment rotates the conducting wire material W by a predetermined angle instead of feeding a conducting wire material W in the axial direction, thereby reducing the cycle time for the process of stripping the insulation coating WL of a conducting wire material W.

In addition, the punch 153 as a stripping blade has a substantially rectangular shape, and at least a pair of two opposing faces are configured to strip the insulation coatings WL. The two faces 1531, 1532 having the striping function are capable of striping the insulation coatings WL of two conducting wire materials W simultaneously. With this configuration, two conducting wire materials W can be processed simultaneously, thereby enhancing the processing efficiency.

Each of the pressing members 130 includes the side-surface pressing members 135 that can change the holding width in the side surface width direction of the conducting wire materials W according to the side surface width of the conducting wire material W, and the upper-surface pressing member 131 that can change the holding width of the conducting wire materials W in the vertical direction.

In the case where the cross-section of the conducting wire material W has a rectangular shape for example, the width dimension in the cross-sectional direction of the conducting wire material W varies when the conducting wire material W is rotated, and the distance between the side-surface pressing member 135 and the conducting wire material W also varies. In addition, the width dimension in the vertical direction (height dimension) of the conducting wire material W varies, and the distance between the upper-surface pressing member 131 and the conducting wire material W also varies. Nevertheless, the conducting wire material W can be reliably positioned and fixed even when the width dimension of the conducting wire material W varies, since the side-surface pressing members 135 and the upper-surface pressing member 131 are movable.

The stripping apparatus according to this embodiment further includes driving mechanisms 140 configured to respectively urge the side-surface pressing members 135 in a direction in which the side-surface pressing members 135 respectively come into contact with the conducting wire materials W. With this configuration, the driving mechanisms 140 cause the side-surface pressing members 135 to come into contact with the conducting wire materials W respectively, whereby the positions of the conducting wire materials W can be easily fixed even when the conducting wire materials W have different widths.

The upper-surface pressing member 131 is joined to the upper mold 150 through the springs 154 serving as elastic members. This enables the upper-surface pressing member 131 to move in the vertical direction by utilizing the strokes of the upper mold 150 to be separated from/approach the lower mold 110. At this time, even when the upper mold 150 continues to approach the lower mold 110, the movement of the upper-surface pressing member 131 can be stopped at the position where the upper-surface pressing member 131 comes into contact with the conducting wire materials W by utilizing the elasticity of the springs 154. This eliminates the need for a driving mechanism, such as a servomotor.

According to the stripping station 1 of the embodiment, a plurality of the stripping molds 11 having the upper molds 150, the lower molds 110, and the pressing members 130 are aligned in the axial direction of the conducting wire materials W. This makes it possible to simultaneously strip a plurality of places of the conducting wire material W, thereby enhancing the processing efficiency.

The stripping apparatus 10 according to the embodiment configured to strip the insulation coatings WL of the conducting wire materials W as long workpieces, the outer peripheries of which are coated with the insulation coatings WL serving as a coating film, includes the punch 153 as a cutting blade configured to move up and down in the vertical direction which is the direction orthogonal to the axial direction of the conducting wire materials W, the upper molds 150 each having the punch 153, the lower molds 110 supporting the conducting wire materials W, the workpiece rotation mechanisms 21 configured to rotate the conducting wire materials W by a predetermined angle around the rotational axes C1 parallel to the axial centers of the conducting wire materials W in synchronization with the upward movement of the upper molds 150.

With this configuration, the conducting wire materials W as workpieces are rotated by a predetermined angle during the time for the upward movement of the punch 153 as a cutting blade or the time for the processing, thus only the stroke time for moving the molds 11 and the time for rotating the conducting wire materials are included in the standby time in which no processing is performed, thereby reducing the cycle time.

The workpiece rotation mechanism 21 according to the embodiment includes the supporting member 211 rotatable while supporting the conducting wire material W as a workpiece, the rotational pin 213 configured to move vertically in synchronization with the vertical movement of the upper molds 150, the springs 214 serving as a rotational-pin urging member configured to urge the rotational pin 213 toward the supporting member 211, the fixed pin 215 the vertical position of which is fixed relative to the supporting member 211, the spring 216 serving as a fixed-pin urging member configured to urge the fixed pin 215 toward the supporting member 211, the protrusions 212 provided on the periphery of the supporting member 211, each of which includes a pin sliding surface 2121 extending radially outwardly, away from the rotational axis C1 of the supporting member 211 gradually from the downstream side to the upstream side of the rotation direction of the workpiece, and cut-away shaped pin engagement parts 2122 disposed at the upstream end of the pin sliding surface 2121 in the rotation direction of the supporting member 211 and configured to engage with the rotational pin 213 or the fixed pin 215.

With this configuration, when the upper mold 150 moves upward, the rotational pin 213 moves upward in synchronization with the movement of the upper mold 150. The rotational pin 213 presses the pin engagement part 2122 upward to rotate the supporting member 211. While the fixed pin 215 slides along the pin sliding surface 2121, the spring 216 serving as a fixed-pin urging member is compressed, then the fixed pin 215 is engaged with the pin engagement part 2122 to prevent backflow (backward rotation of the supporting member 211). The rotation of the supporting member 211 stops and the upper mold 150 and the rotational pin 213 are lowered. Each of the conducting wire materials W as a workpiece is subjected to the processing again at the rotated position so that a side surface different from the side surface that has been processed is processed. In other words, the movement of the upper mold 150 and the rotation of the conducting wire material W can be synchronized with each other with a simple configuration. The rotation angle can be adjusted by changing the number of the protrusions 212 and the size of the supporting member 211.

The present invention is not limited to the above embodiments, and variations, improvements, and the like capable of achieving the object of the invention are intended to be within the scope of the invention. For example, each of the conducting wire materials W has a rectangular-shaped cross-section, but is not limited thereto. The cross-section of each of the conducting wire materials W may have any quadrilateral shape, such as a trapezoid. The insulation coatings WL of two conducting wire materials W are stripped simultaneously, but the number of the conducting wire materials W is not limited to two. A pair of two side surfaces 1531, 1532 in the cross-sectional direction of the punch 153 are configured to strip the insulation coatings WL of the conducting wire materials W simultaneously, but the configuration is not limited thereto. Any stripping blade having at least a pair of two opposing faces that can strip the insulation coatings WL may be used. The workpiece rotation mechanism is not limited to the workpiece rotation mechanism 21 of the above embodiments. For example, the supporting member 211 rotates in synchronization with the upward movement of the upper molds 150, but the configuration is not limited thereto. Any configuration may be employed as long as the conducting wire materials W are rotated by a predetermined angle around the rotational axes C1, which are parallel to the axial center of the conducting wire materials W as workpieces, in synchronization with the upward and/or downward movement of the upper molds 150. Specifically, an ordinary collet chuck or the like may be used and rotated by a predetermined angle by a servo motor or the like while holding the conducting wire material W. The upper-surface pressing member 131 is supported by the upper mold 150 through the springs 154, but the configuration is not limited thereto. For example, the motor may drive the upper surface pressing part relative to the upper mold 150. The configuration of each component of the stripping apparatus is not limited to that of the stripping apparatus 10 of the above embodiments. The configuration of each component of the stripping station is not limited to that of the stripping station 1 of the above embodiments.

EXPLANATION OF REFERENCE NUMERALS 1 stripping station
10 stripping apparatus
21 workpiece rotation mechanism (rotation mechanism)
110 lower mold
130 pressing member
131 upper-surface pressing member
135 side-surface pressing member
140 driving mechanism
150 upper mold
153 punch (stripping blade)
154 spring
1531, 1532 two side surfaces (two faces)
C1 axial center position (rotational axis)
W conducting wire material (workpiece)
WL insulation coating (coating film)

What is claimed is:

1. A stripping apparatus configured to strip an insulation coating from a conducting wire material cross-section of which orthogonal to a longitudinal direction has a rectangular shape, the stripping apparatus comprising:
    an upper mold provided with a stripping blade configured to strip the insulation coating;
    a lower mold configured to support the conducting wire material from a lower side thereof;
    a pressing member configured to prevent displacement of the conducting wire material; and
    a rotation mechanism configured to rotate the conducting wire material around a rotational axis that is parallel to an axial center of the conducting wire material,
    wherein the stripping blade has a substantially rectangular parallelepiped shape, and at least a pair of two opposing faces of the stripping blade have a stripping function to strip the insulation coating,
    wherein the lower mold is configured to support two of the conducting wire materials and the upper mold is configured to position the stripping blade between the two conducting wire materials, and
    wherein with the stripping blade positioned between the two conducting wire materials, the two opposing faces having the stripping function are configured to simultaneously strip insulation coatings of the two conducting wire materials that are disposed on the lower mold to hold the stripping blade therebetween.

2. The stripping apparatus according to claim 1,
    wherein the pressing member comprises:
    a side-surface pressing member configured to change a holding width in a side surface width direction of the conducting wire material according to a side surface width of the conducting wire material; and
    an upper-surface pressing member configured to change a holding width in a vertical direction of the conducting wire material according to a vertical width of the conducting wire material.

3. The stripping apparatus according to claim 2, further comprising:
    a driving mechanism configured to urge the side-surface pressing member in a direction in which the side-surface pressing member comes into contact with the conducting wire material.

4. The stripping apparatus according to claim 3,
    wherein the upper-surface pressing member is joined to the upper mold through an elastic member.

5. A stripping station comprising:
    the stripping apparatus according to claim 1, further comprising a plurality of stripping molds each including the upper mold, the lower mold, and the pressing member of claim 1, wherein the stripping molds are aligned in an axial direction of the conducting wire material.

* * * * *